(12) United States Patent
Goto et al.

(10) Patent No.: US 8,539,280 B2
(45) Date of Patent: Sep. 17, 2013

(54) STORAGE SYSTEM AND FAILOVER CONTROL METHOD

(75) Inventors: Satoru Goto, Nagoya (JP); Yukihito Hara, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 89 days.

(21) Appl. No.: 13/247,225

(22) Filed: Sep. 28, 2011

(65) Prior Publication Data

US 2012/0079319 A1   Mar. 29, 2012

(30) Foreign Application Priority Data

Sep. 28, 2010   (JP) .................................. 2010-217438

(51) Int. Cl.
  *G06F 11/00*   (2006.01)
(52) U.S. Cl.
  USPC .......................................... 714/6.3; 714/6.12
(58) Field of Classification Search
  USPC .......................................................... 714/6.3
  See application file for complete search history.

(56) References Cited

U.S. PATENT DOCUMENTS

| | | | | |
|---|---|---|---|---|
| 6,079,029 | A * | 6/2000 | Iwatani et al. ................ | 714/6.12 |
| 7,249,277 | B2 * | 7/2007 | Arai et al. ..................... | 714/6.21 |
| 7,287,186 | B2 * | 10/2007 | McCrory et al. ................ | 714/13 |
| 7,308,532 | B1 * | 12/2007 | Wood et al. ..................... | 711/112 |
| 7,526,668 | B2 * | 4/2009 | Shitomi et al. .................... | 714/3 |
| 8,099,622 | B2 * | 1/2012 | Shitomi et al. .................... | 714/3 |
| 2006/0129875 | A1 * | 6/2006 | Barrall ................................ | 714/6 |
| 2007/0079068 | A1 * | 4/2007 | Draggon ........................ | 711/114 |
| 2008/0010485 | A1 * | 1/2008 | Shitomi et al. .................... | 714/3 |
| 2009/0177720 | A1 * | 7/2009 | Shitomi et al. ................ | 707/204 |

FOREIGN PATENT DOCUMENTS

| | | |
|---|---|---|
| JP | 2006-99440 | 4/2006 |
| JP | 2006-134026 A | 5/2006 |
| JP | 2006-268420 A | 10/2006 |
| JP | 2007-47986 A | 2/2007 |
| JP | 2007-148982 A | 6/2007 |

OTHER PUBLICATIONS

Office Action issued Aug. 28, 2012, in Japanese Patent Application No. 2010-217438 with English translation.

* cited by examiner

*Primary Examiner* — Kamini Patel
(74) *Attorney, Agent, or Firm* — Oblon, Spivak, McClelland, Maier & Neustadt, L.L.P.

(57) ABSTRACT

A storage system is capable of configuring a failover system by use of a first storage processing device to which first storage media are connected and a second storage processing device to which second storage media are connected. The storage system sets the RAID level of the second storage media to a RAID level with lower redundancy than the RAID level of the first storage media, if the storage capacity of the second storage media is smaller than the storage capacity of the first storage media.

4 Claims, 3 Drawing Sheets

STORAGE SYSTEM AND FAILOVER CONTROL METHOD

CROSS REFERENCE TO RELATED APPLICATION

This application is based upon and claims the benefit of priority from the prior Japanese Patent Application No. 2010-217438 filed on Sep. 28, 2010; the entire contents of which are incorporated herein by reference.

BACKGROUND OF INVENTION

1. Field of Invention

This invention relates to a storage system capable of configuring a failover system by using two storage processing devices to which storage media are connectable, and to a failover control method used in the storage system.

2. Descriptions of the Related Art

Heretofore, some systems have employed a failover configuration to improve the reliability of the systems. In a system employing the failover configuration (failover system), for example, one of two servers serves as a main and the other serves a backup. The main server performs processing for tasks under normal condition. When the main server fails, the backup server takes over the processing for the tasks.

In recent years, storage processing devices called network attached storages (NAS) have been widely used. Plural storage media can be connected to the NAS, and various types of content data such as video and audio data can be stored in the storage media. Upon receiving a request for content data from a terminal device via a network, the NAS transmits the requested content data to the terminal device via the network. The terminal device reproduces the content of the received content data.

A proposal has been made to build a failover configuration for a system using NAS. In a failover system including two NAS, one NAS is the main and the other NAS is the backup. The two NAS can configure the failover system if the storage capacity of the storage media connected to the backup NAS is equal to or larger than the storage capacity of the storage media connected to the main NAS (for example, see Japanese Patent Application Publication No. 2006-99440). In the case where the two NAS can configure the failover system, as similar to the above system, the main NAS performs processing for tasks under normal conditions, and the backup NAS takes over the processing for the tasks when the main NAS fails.

SUMMARY OF INVENTION

However, in many cases, small-scale users such as individual users only have low-capacity storage media which are each usable as a storage medium connected to the backup NAS. In these cases, the users are not allowed to configure the failover system, which is an uneconomical situation with low use efficiency of storage media.

In view of the problem described above, an object of this invention is to provide a storage system and a failover control method which are capable of configuring a failover system with lower dependency on storage capacities of storage media than ever before.

According to one of the features of this invention, there is provided a storage system capable of configuring a failover system by use of a first storage processing device to which first storage media are connected and a second storage processing device to which second storage media are connected, the storage system including a RAID level setting unit for setting the RAID level of the second storage media to a RAID level with lower redundancy than the RAID level of the first storage media, if the storage capacity of the second storage media is smaller than the storage capacity of the first storage media.

In the storage system described above, if the storage capacity of the second storage media is smaller than the storage capacity of the first storage media, the redundancy of the RAID level of the second storage media is made lower than the redundancy of the RAID level of the first storage media. Thus, the space large enough to store the user data is secured in the second storage media, and the user data stored in the first storage media can be stored in the second storage media. In other words, the failover system can be configured by using the first storage processing device and the second storage processing device.

According to another feature of this invention, the storage system further comprises a storage controller for stopping application of RAID scheme to the second storage media and storing the user data stored in the first storage media into the second storage media, if free space in the second storage media is equal to or larger in size than user data stored in the first storage media.

According to another feature of this invention, the storage system further comprises a first notification unit for notifying that the RAID level of the second storage media is the RAID level with the lower redundancy than the RAID level of the first storage media.

According to another feature of this invention, the storage system further comprises a second notification unit for notifying that the free space in the second storage media is smaller than a predetermined value if the free space in the second storage media is smaller than the predetermined value.

According to one of the features of this invention, there is provided a failover control method in a storage system capable of configuring a failover system by use of a first storage processing device to which first storage media are connected and a second storage processing device to which second storage media are connected, the failover control method comprising: the step of setting the RAID level of the second storage media to a RAID level with lower redundancy than the RAID level of the first storage media, if the storage capacity of the second storage media is smaller than the storage capacity of the first storage media.

DESCRIPTION OF EMBODIMENTS

Figure 1:
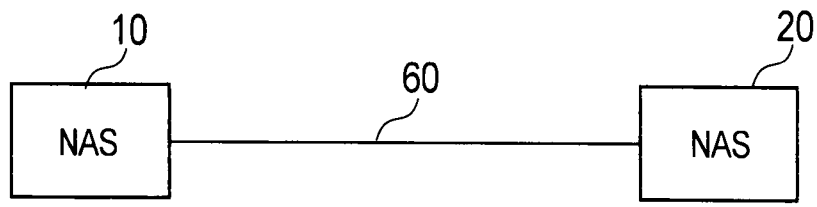
FIG. 1 is the overall structural diagram of a storage system as an embodiment of this invention.

An embodiment of the present invention will be described with reference to the attached drawings. The configuration of a storage system, the configuration of a NAS, the operation of the storage system, the obtained results, and other embodiments will be described. In the drawings of the embodiment below, the same or similar components are labeled with the same or similar reference numerals.

(1) Configuration of Storage System

FIG. 1 is an overall structural diagram of the storage system. The storage system shown in FIG. 1 includes a network attached storage (NAS) 10 and a NAS 20 which are storage processing devices, and a communication line 60 connecting the NAS 10 and the NAS 20 to each other.

In the storage system of the embodiment, one of the NAS 10 and the NAS 20 is a main and the other is a backup. Moreover, settings and data are synchronized between the NAS 10 and the NAS 20. In this configuration, the main NAS performs processing for tasks under normal conditions, and the backup NAS takes over the processing for the tasks when the main NAS fails. Descriptions are given below of an example in which the NAS 10 and the NAS 20 configure the failover system, as the main and the backup, respectively.

(2) Configuration of NAS (2-1) Configuration of NAS 10

Figure 2:
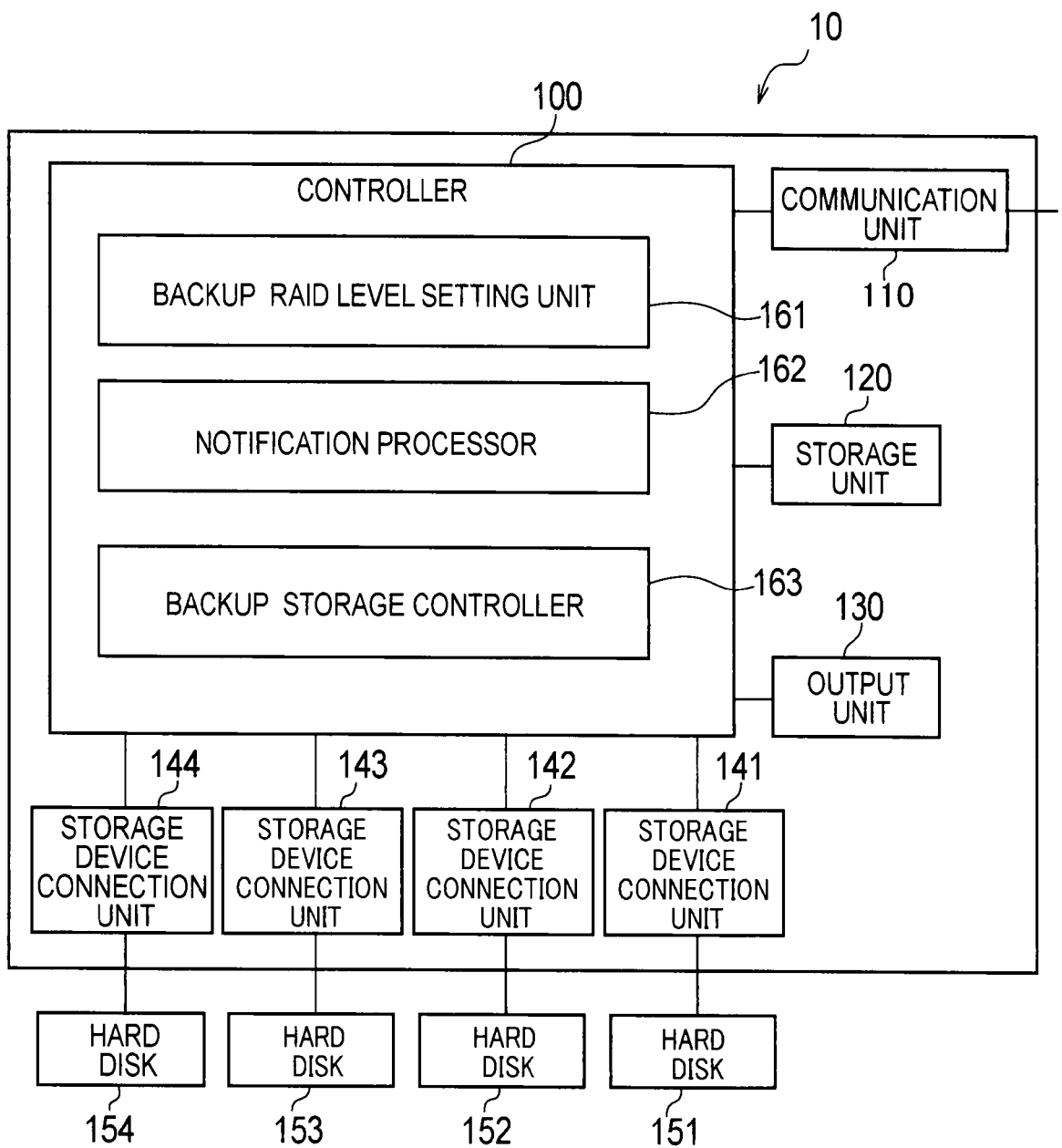
FIG. 2 is the diagram of a first structure of a NAS as an embodiment of this invention.

FIG. 2 is a diagram of a structure of the NAS 10. The NAS 10 shown in FIG. 2 includes a controller 100, a communication unit 110, a storage unit 120, an output unit 130, a storage device connection unit 141, a storage device connection unit 142, a storage device connection unit 143, and a storage device connection unit 144.

The controller 100 is, for example, a CPU, and controls various functions which the NAS 10 has.

The communication unit 110 is, for example, a LAN card, and a medium access control (MAC) address is assigned thereto. The communication unit 110 is a communication interface for communicating with the outside, and communicates with the NAS 20 via the communication line 60.

The storage unit 120 is, for example, a NAND flash memory, and stores various types of information used for the control of the NAS 10. The storage unit 120 stores various types of setting information required to configure the failover system. The storage device connection unit 141 is used to connect a hard disk 151. The storage device connection unit 142 is used to connect a hard disk 152. The storage device connection unit 143 is used to connect a hard disk 153. The storage device connection unit 144 is used to connect a hard disk 154. The hard disks 151 to 154 form a RAID configuration, and store data to be synchronized between the main and the backup such as user data.

The controller 100 includes a backup RAID level setting unit 161, a notification processor 162, and a backup storage controller 163.

The backup RAID level setting unit 161 sets the RAID levels of a hard disk 251, a hard disk 252, a hard disk 253, and a hard disk 254 (described later) which are connected to the NAS 20 which is the backup.

The backup RAID level setting unit 161 generates information (storage capacity request information) for requesting the NAS 20 for the storage capacities of the hard disks 251 to 254, and outputs the storage capacity request information to the communication unit 110. The communication unit 110 transmits the storage capacity request information to the NAS 20 via the communication line 60.

Upon receiving the storage capacity request information, the NAS 20 transmits information (second storage capacity information) indicating the storage capacity of the hard disks 251 to 254 to the NAS 10 via the communication line 60.

The communication unit 110 in the NAS 10 receives the second storage capacity information and outputs the second storage capacity information to the controller 100. When the second storage capacity information is inputted, the backup RAID level setting unit 161 judges whether or not the storage capacity (second storage capacity) of the hard disks 251 to 254 which is indicated by the second storage capacity information is smaller than the storage capacity (first storage capacity) of the hard disks 151 to 154.

If the storage capacity of the hard disks 251 to 254 is smaller than the storage capacity of the hard disks 151 to 154, the backup RAID level setting unit 161 sets the RAID level of the hard disks 251 to 254 to a RAID level with lower redundancy than the predetermined RAID level of the hard disks 151 to 154. Here, the redundancy represents a value corresponding to the data size of parity data or the like required in the application of the RAID scheme. A RAID level with a larger ratio of the data size of the parity data to the data size of user data is a RAID level with higher redundancy.

For example, when the RAID level of the hard disks 151 to 154 is RAID 6, the backup RAID level setting unit 161 sets the RAID level of the hard disks 251 to 254 to RAID 5.

Next, the backup RAID level setting unit 161 outputs information (RAID level setting information) indicating the set RAID level of the hard disks 251 to 254 to the communication unit 110. The communication unit 110 transmits the RAID level setting information to the NAS 20 via the communication line 60.

When the backup RAID level setting unit 161 sets the RAID level of the hard disks 251 to 254 to a RAID level with lower redundancy than the predetermined RAID level of the hard disks 151 to 154, the notification processor 162 generates output information (image information and audio information) indicating this setting, and outputs the output information to the output unit 130. The output unit 130 consists of a monitor and a speaker, and outputs image and audio data based on the inputted output information.

Meanwhile, upon receiving the RAID level setting information from the NAS 10, the NAS 20 sets the RAID level of the hard disks 251 to 254. Then, the NAS 20 judges whether or not the NAS 20 with the set RAID level can configure the failover system together with the NAS 10. If the NAS 20 cannot configure the failover system, the NAS 20 transmits information (free space information) indicating the free space in the hard disks 251 to 254 to the NAS 10 via the communication line 60.

The communication unit 110 in the NAS 10 receives the free space information, and outputs the free space information to the controller 100. When the free space information is inputted, the backup storage controller 163 judges whether or not the free space in the hard disks 251 to 254 which is indicated by the free space information is equal to or larger in size than the user data (synchronization user data) to be synchronized between the NAS 10 and the NAS 20 in the failover system. Here, the synchronization user data is stored in the hard disks 151 to 154.

If the free space in the hard disks 251 to 254 is equal to or larger in size than the synchronization user data, the backup storage controller 163 generates information (RAID application stop request information) for requesting the NAS 20 to stop application of the RAID scheme, and outputs the RAID application stop request information to the communication unit 110. The communication unit 110 transmits the RAID application stop request information to the NAS 20 via the communication line 60. Furthermore, the backup storage controller 163 reads the synchronization user data stored in the hard disks 151 to 154, and outputs the synchronization user data to the communication unit 110. The communication unit 110 transmits the synchronization user data to the NAS 20 via the communication line 60.

Meanwhile, if the free space in the hard disks 251 to 254 is smaller in size than the synchronization user data, the notification processor 162 generates output information (image information and audio information) to that effect, and outputs the output information to the output unit 130. The output unit 130 outputs image and audio data based on the inputted output information.

Upon receiving the RAID application stop request information, the NAS 20 stops the application of the RAID scheme to the hard disks 251 to 254. Then, upon receiving the synchronization user data, the NAS 20 stores the synchronization user data in the hard disks 251 to 254 to which any RAID scheme is no longer applied.

(2-2) Configuration of NAS 20

Figure 3:
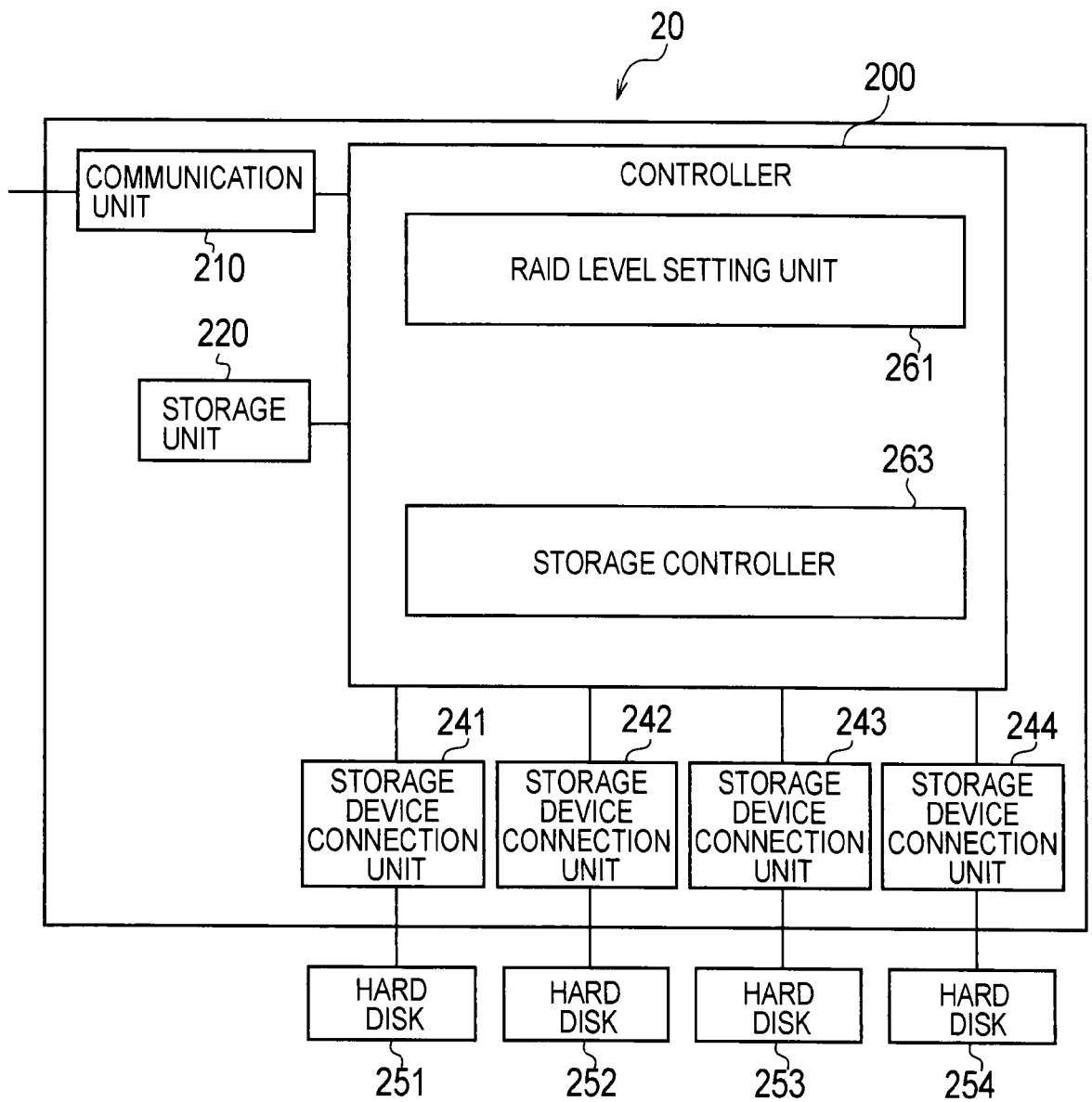
FIG. 3 is the diagram of a second structure of a NAS as another embodiment of this invention.

FIG. 3 is a diagram of a structure of the NAS 20. The NAS 20 shown in FIG. 3 includes a controller 200, a communication unit 210, a storage unit 220, a storage device connection unit 241, a storage device connection unit 242, a storage device connection unit 243, and a storage device connection unit 244.

The controller 200 is, for example, a CPU, and controls various functions which the NAS 20 has.

The communication unit 210 is, for example, a LAN card, and a MAC address is assigned thereto. The communication unit 210 is a communication interface for communicating with the outside, and communicates with the NAS 10 via the communication line 60.

The storage unit 220 is, for example, a NAND flash memory, and stores various types of information used for the control of the NAS 20. The storage unit 220 stores various types of setting information required to configure the failover system. The storage device connection unit 241 is used to connect a hard disk 251. The storage device connection unit 242 is used to connect a hard disk 252. The storage device connection unit 243 is used to connect a hard disk 253. The storage device connection unit 244 is used to connect a hard disk 254. The hard disks 251 to 254 form a RAID configuration, and store data to be synchronized between the main and the backup such as user data.

The controller 200 includes a RAID level setting unit 261 and a storage controller 263.

The communication unit 210 receives the storage capacity request information from the NAS 10, and outputs the storage capacity request information to the controller 200. When the storage capacity request information is inputted, the RAID level setting unit 261 generates the information (second storage capacity information) indicating the storage capacity of the hard disks 251 to 254. Then, the RAID level setting unit 261 outputs the second storage capacity information to the communication unit 210. The communication unit 210 transmits the inputted second storage capacity information to the NAS 10 via the communication line 60.

Thereafter, upon receiving the RAID level information from the NAS 10, the communication unit 210 outputs the RAID level information to the controller 200. The RAID level setting unit 261 sets the RAID level indicated by the inputted RAID level information as the RAID level of the hard disks 251 to 254.

The storage controller 263 judges whether or not the NAS 20 with the RAID level set for the hard disks 251 to 254 can configure the failover system together with the NAS 10. For example, the storage controller 263 judges that the NAS 20 cannot configure the failover system together with the NAS 10 when the storage area where to store the synchronization user data in the hard disks 251 to 254 set to a certain RAID level is equal to or smaller than a predetermined value.

If the NAS 20 cannot configure the failover system together with the NAS 10, the storage controller 263 generates the information (free space information) on the free space currently available in the hard disks 251 to 254, and outputs the free space information to the communication unit 210. The communication unit 210 transmits the inputted free space information to the NAS 10 via the communication line 60.

Thereafter, upon receiving the RAID application stop request information from the NAS 10, the communication unit 210 outputs the RAID application stop request information to the controller 200. Then, upon receiving the synchronization user data from the NAS 10, the communication unit 210 outputs the synchronization user data to the controller 200.

The RAID level setting unit 261 stops the application of the RAID scheme to the hard disks 251 to 254 in response to the inputted RAID application stop request information. Then, the storage controller 263 stores the inputted synchronization user data in the hard disks 251 to 254 to which any RAID scheme is not applied.

(3) Operation of Storage System

Figure 4:
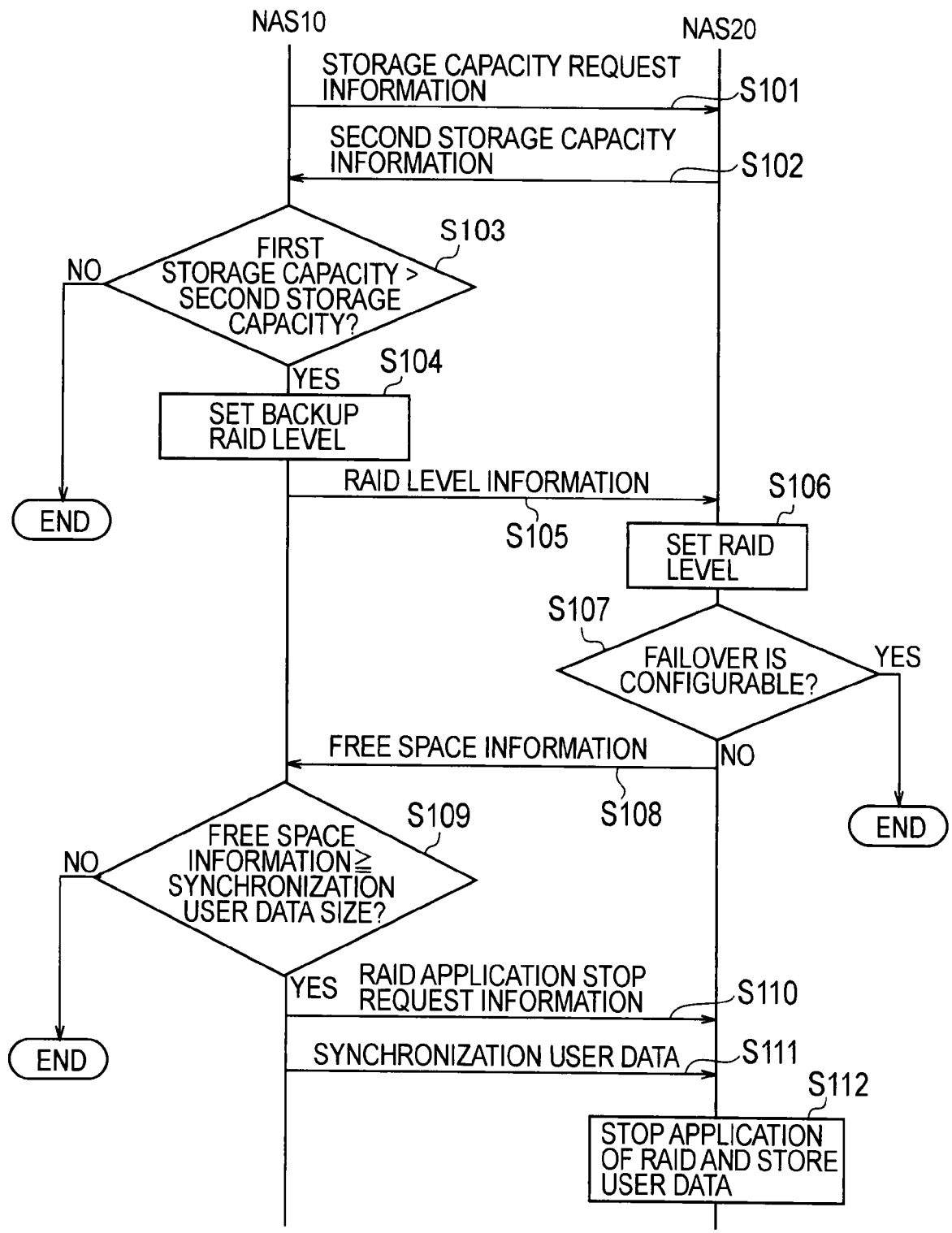
FIG. 4 is a sequence diagram of an operation of the storage system of the embodiment of this invention.

FIG. 4 is a sequence diagram of an operation of the storage system.

In Step S101, the NAS 10 transmits the storage capacity request information. The NAS 20 receives the storage capacity request information from the NAS 10.

In Step S102, the NAS 20 transmits the information (second storage capacity information) on the storage capacity of the hard disks 251 to 254. The NAS 10 receives the second storage capacity information from the NAS 20.

In Step S103, the NAS 10 judges whether or not the storage capacity (second storage capacity) of the hard disks 251 to 254 is smaller than the storage capacity (first storage capacity) of the hard disks 151 to 154. If the second storage capacity is larger than the first storage capacity, the series of operations are terminated.

Meanwhile, if the second storage capacity is smaller than the first storage capacity, the NAS 10 sets the RAID level of the hard disks 251 to 254 to a RAID level with lower redundancy than the RAID level of the hard disks 151 to 154 in Step S104.

In Step S105, the NAS 10 transmits the information on the RAID level set in Step S104. The NAS 20 receives the RAID level information from the NAS 10.

In Step S106, the NAS 20 sets the RAID level indicated by the received RAID level information for the hard disks 251 to 254.

In Step S107, the NAS 20 judges whether or not the NAS 20 with the RAID level set for the hard disks 251 to 254 can configure the failover system together with the NAS 10.

If the NAS 20 can configure the failover system, the series of operations are terminated. Meanwhile, if the NAS 20 cannot configure the failover system, the NAS 20 transmits the information on the free space in the hard disks 251 to 254 in Step S108. The NAS 10 receives the free space information from the NAS 20.

In Step S109, the NAS 10 judges whether or not the free space in the hard disks 251 to 254 is equal to or larger in size than the synchronization user data. If the free space in the hard disks 251 to 254 is smaller in size than the synchronization user data, the series of operations are terminated.

Meanwhile, if the free space in the hard disks 251 to 254 is equal to or larger in size than the synchronization user data, the NAS 10 transmits the RAID application stop request information in Step S110. The NAS 20 receives the RAID application stop request information.

In Step S111, the NAS 10 transmits the synchronization user data. The NAS 20 receives the synchronization user data.

The NAS 20 stops the application of the RAID scheme to the hard disks 251 to 254 in Step S112. Then, the NAS 20 stores the synchronization user data in the hard disks 251 to 254 to which any RAID scheme is not applied.

(4) Obtained Results

In the storage system of the embodiment, the following setting is performed when the NAS 10 and the NAS 20 configure the failover system. If the storage capacity of the hard disks 251 to 254 connected to the NAS 20 is smaller than the storage capacity of the hard disks 151 to 154 connected to the NAS 10, the NAS 10 sets the RAID level of the hard disks 251 to 254 to a RAID level with lower redundancy than the RAID level set for the hard disks 151 to 154. Accordingly, the space large enough to store the user data can be secured in the hard disks 251 to 254. Moreover, the failover system including the NAS 10 and the NAS 20 can be configured by storing the user data stored in the hard disks 151 to 154 into the hard disks 251 to 254.

Furthermore, in the storage system of the embodiment, the NAS 10 stops the application of the RAID scheme to the hard disks 251 to 254 in the case where, even if the RAID level of the hard disks 251 to 254 is set to a RAID level with lower redundancy than the RAID level of the hard disks 151 to 154, the failover system cannot be configured and the free space in the hard disks 251 to 254 is equal to or larger in size than the synchronization data. Thus, the space large enough to store the user data can be secured in the hard disks 251 to 254.

(5) Other Embodiments

As described above, the details of this invention have been disclosed by using the embodiments of this invention. However, it should not be understood that the description and drawings which constitute part of this disclosure limit this invention. From this disclosure, various alternative embodiments, examples, and operation techniques will be easily found by those skilled in the art.

In the embodiment described above, the NAS 10 sets the RAID level of the hard disks 251 to 254 connected to the NAS 20, and stops the application of the RAID scheme. However, the NAS 20 may perform these controls. In this case, the NAS 20 requests the storage capacity of the hard disks 151 to 154 from NAS 10. Then, if the obtained storage capacity of the hard disks 251 to 254 is smaller than the storage capacity of the hard disks 151 to 154, the NAS 20 sets the RAID level of the hard disks 251 to 254 to a RAID level with lower redundancy than the RAID level of the hard disks 151 to 154.

Moreover, the NAS 20 grasps the data size of the synchronization user data from the NAS 10. Then, if the free space in the hard disks 251 to 254 is equal to or larger in size than the synchronization user data, the NAS 20 stops the application of the RAID scheme to the hard disks 251 to 254, and stores the synchronization user data in the hard disks 251 to 254.

Moreover, a device (for example, a server) other than the NAS 10 and the NAS 20 may set the RAID level of the hard disks 251 to 254 connected to the NAS 20 and stop the application of the RAID scheme.

In this case, the server obtains the storage capacity of the hard disks 151 to 154 from the NAS 10, and obtains the storage capacity of the hard disks 251 to 254 from the NAS 20. Then, if the storage capacity of the hard disks 251 to 254 is smaller than the storage capacity of the hard disks 151 to 154, the server sets the RAID level of the hard disks 251 to 254 to a RAID level with lower redundancy than the RAID level of the hard disks 151 to 154, and sends the RAID level information to the NAS 20.

In addition, the server obtains the data size of the synchronization user data from the NAS 10, and obtains the free space size in the hard disks 251 to 254 from the NAS 20. Then, if the free space of the hard disks 251 to 254 is equal to or larger in size than the synchronization user data, the server transmits RAID application stop request information to the NAS 20.

Furthermore, in the embodiment described above, the hard disks are connected to the NAS 10 and the NAS 20. However, the storage media connected to the NAS 10 and the NAS 20 are not limited thereto. For example, a storage medium such as a solid state drive (SSD), a flash memory, or a SD card may be connected.

In this manner, this invention naturally includes various embodiments not specifically described herein.

What is claimed is:

1. A storage system capable of configuring a failover system by use of a first storage processing device to which first storage media are connected and a second storage processing device to which second storage media are connected, the storage system including:
   a communication interface configured to receive storage capacity information representing a storage capacity of the second storage media; and
   circuitry configured to:
      compare the storage capacity of the second storage media to a storage capacity of the first storage media;
      set a RAID level of the second storage media to a RAID level with lower redundancy than the RAID level of the first storage media, if the storage capacity of the second storage media is smaller than the storage capacity of the first storage media; and
      stop application of RAID scheme to the second storage media and store user data stored in the first storage media into the second storage media when the failover system cannot be configured by use of the second storage media having the RAID level with lower redundancy than the RAID level of the first storage media.

2. The storage system according to claim 1, further including:
   an interface configured to output a notification that the RAID level of the second storage media is a RAID level with the lower redundancy than the RAID level of the first storage media.

3. The storage system according to claim 1, further including:
   an interface configured to output a notification that the free space in the second storage media is smaller than a predetermined value.

4. A failover control method used in a storage system capable of configuring a failover system by use of a first storage processing device to which first storage media are connected and a second storage processing device to which second storage media are connected, the failover control method including:
   acquiring storage capacity information representing a storage capacity of the second storage media;
   comparing the storage capacity of the second storage media to a storage capacity of the first storage media; and
   setting the RAID level of the second storage media to a RAID level with lower redundancy than the RAID level of the first storage media, if the storage capacity of the second storage media is smaller than the storage capacity of the first storage media; and
   stopping application of RAID scheme to the second storage media and storing user data stored in the first storage media into the second storage media when the failover system cannot be configured by use of the second storage media having the RAID level with lower redundancy than the RAID level of the first storage media.

* * * * *